United States Patent [19]

Mao et al.

[11] Patent Number: 4,780,036
[45] Date of Patent: Oct. 25, 1988

[54] RE-USABLE NUT-LOCKING ASSEMBLY

[75] Inventors: Daniel Mao, Salon de Provence; Marc Declercq, Pelissane, both of France

[73] Assignee: Aerospatiale Societe Nationale Industrielle, France

[21] Appl. No.: 97,594

[22] Filed: Sep. 15, 1987

[30] Foreign Application Priority Data

Sep. 15, 1986 [FR] France ............................ 86 12850

[51] Int. Cl.⁴ .............................................. F16B 39/02
[52] U.S. Cl. .................................... 411/194; 411/206; 411/228; 411/254; 411/970
[58] Field of Search ............... 411/119–121, 411/194, 204, 206, 193, 227–229, 207, 208, 254, 970, 6, 7

[56] References Cited

U.S. PATENT DOCUMENTS

| 126,223 | 4/1872 | Morrison | 411/194 |
| 550,905 | 12/1895 | Case | 411/120 |
| 783,178 | 2/1905 | Cosey | 411/204 X |
| 913,266 | 2/1909 | Cottrell | 411/204 |
| 1,373,335 | 3/1921 | Kimball | 411/206 |
| 1,414,188 | 4/1922 | Jones et al. | 411/204 X |
| 1,603,952 | 10/1926 | Huffer | 411/204 |
| 1,651,188 | 11/1927 | Cole | 411/204 |
| 1,869,947 | 8/1932 | Shook | 411/204 |
| 2,567,902 | 9/1951 | Bedford, Jr. | 411/970 X |
| 2,899,700 | 8/1959 | Egan | 411/119 X |
| 3,022,809 | 2/1962 | Kottsieper | 411/197 |
| 3,420,287 | 1/1969 | McCormick | 411/121 |
| 3,645,311 | 2/1972 | Tinnerman | 411/970 X |
| 4,493,597 | 1/1985 | Rolf | 411/193 X |
| 4,534,101 | 8/1985 | Rosán, Jr. | 411/120 X |

FOREIGN PATENT DOCUMENTS

| 518705 | 2/1931 | Fed. Rep. of Germany | 411/228 |
| 819731 | 7/1937 | France | 411/229 |
| 2358581 | 2/1978 | France | 411/204 |
| 260317 | 9/1928 | Italy | 411/204 |
| 389786 | 3/1933 | United Kingdom | 411/204 |

Primary Examiner—Lloyd A. Gall
Attorney, Agent, or Firm—McGlew and Tuttle

[57] ABSTRACT

This assembly comprises a collar (3) having splines cooperating with splines on the bolt (1) and lateral tabs (4) in contact with flat sides of the nut (2). This assembly further comprises at least one bent elastically yieldable locking element (5, 5') having a first branch (6, 6') trapped between a tab (4) of the collar (3) and a flat side of the nut, a second branch (8, 8') having an aperture (9, 9') through which extends the bolt and which has an edge engaged between screw threads of the bolt. By exerting a lateral pressure on the locking elements (5, 5'), the screw threads of the bolt are elastically disengaged.

9 Claims, 2 Drawing Sheets

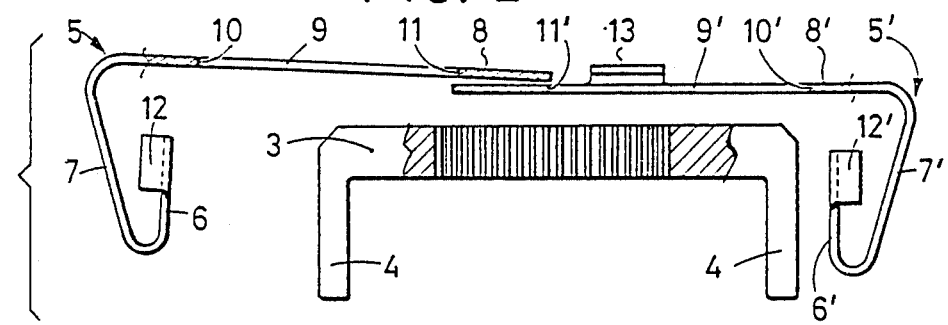
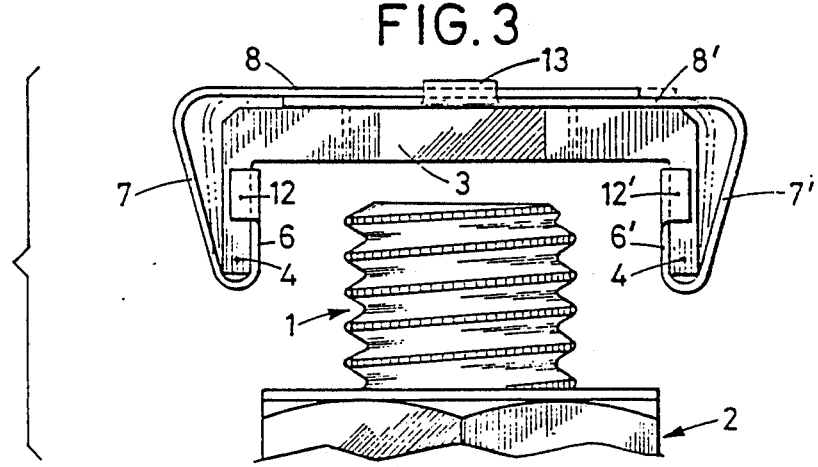
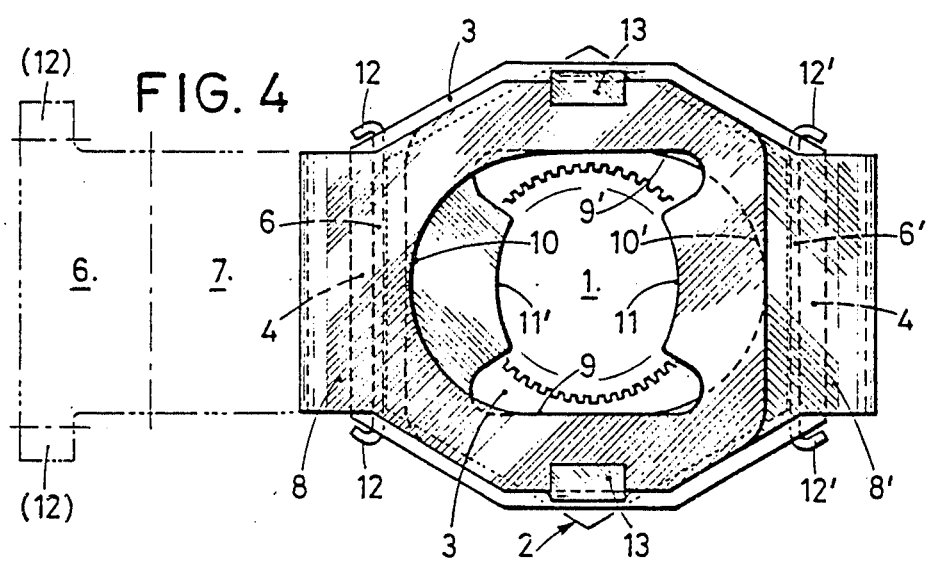

RE-USABLE NUT-LOCKING ASSEMBLY

BACKGROUND OF THE INVENTION

The present invention relates to a nut-locking device.

Many assemblies of nuts and lock-washers are known for preventing the nut from untightening after it has been placed in position and tightened on a bolt.

Document FR-A-2,025,676 in particular describes such an assembly in which a cylindrical collar having internal splines and teeth which axially project is forcefully pressed on the bolt on top of the nut after the latter has been tightened.

The nut has axial apertures adapted to receive the teeth of the collar when it is pressed on the bolt, the latter also having if desired splines corresponding to those of the collar with which they cooperate.

An assembly of this type is relativey effective, but however does not afford complete safety. Indeed, the collar must not move up the bolt away from the nut.

For this purpose, the apertures of the bolt are drilled obliquely and diverge outwardly so as to deform the teeth of the collar which is of a relatively malleable metal and, owing to this malleability, there is a danger that the teeth leave the apertures of the bolt, for example under the action of large vibrations.

In other known devices, described for example document U.S. Pat. No. 3,022,809, a collar is mounted on the bolt with which it cooperates through splines and is then clipped onto the nut.

In all these arrangements, the behavior of the collar depends on the resistance of the latter to deformation, this resistance being however required to permit the initial deformation. Such a compromise is not absolutely reliable and the collar cannot be recovered in the event of disassembly.

SUMMARY OF THE INVENTION

An object of the invention is to provide a nut-locking assembly of the aforementioned type in which the collar is positively locked on the bolt, but in a detachable manner, thus permitting a disassembly and re-use of the assembly.

The invention therefore provides a re-usable assembly for locking a nut on a bolt, of the type comprising a collar whose opening has inner splines adapted to cooperate with complementary splines provided on the bolt, and two axially extending lateral tabs for straddling the nut in contact with the flat sides of the latter, said assembly comprising at least one bent elastically yieldable locking element having a first branch bearing against one of the tabs of the collar and a second branch having a portion which is engaged between two of the screw threads of the bolt above the collar and in contact with the collar.

Preferably, a locking element is provided associated with each of the tabs of the collar.

According to another feature of the invention, each elastically yieldable locking element is made from a spring steel strip, its first branch being parallel to the axis of the bolt and trapped between said tab of the collar and a flat side of the nut and connected to the second branch by an intermediate portion ensuring the elasticity of the element.

According to a further feature of the invention, the second branch of each locking element has an elongated aperture through which the bolt extends in a direction roughly perpendicular to said branch.

According to one embodiment, the length of said aperture is a little greater than the diameter of the bolt.

Advantageously, in the unstressed condition of the locking element, said portion of the second branch engaged between the threads of the bolt partly extends across the opening of the collar.

The following description, with reference to the accompanying drawings given by way of a non-limiting example, will explain how the invention can be put into practice.

BRIEF DESCRIPTION OF THE DRAWING

FIGS. 2 and 3 show the two stages for placing the assembly according to invention in position on a nut screwed on a bolt.

FIG. 4 is a top plan view of the assembly placed in position also showing in dot-dash lines the developed shape of a locking element.

DESCRIPTION OF THE PREFERRED EMBODIMENTS

Figure 1:
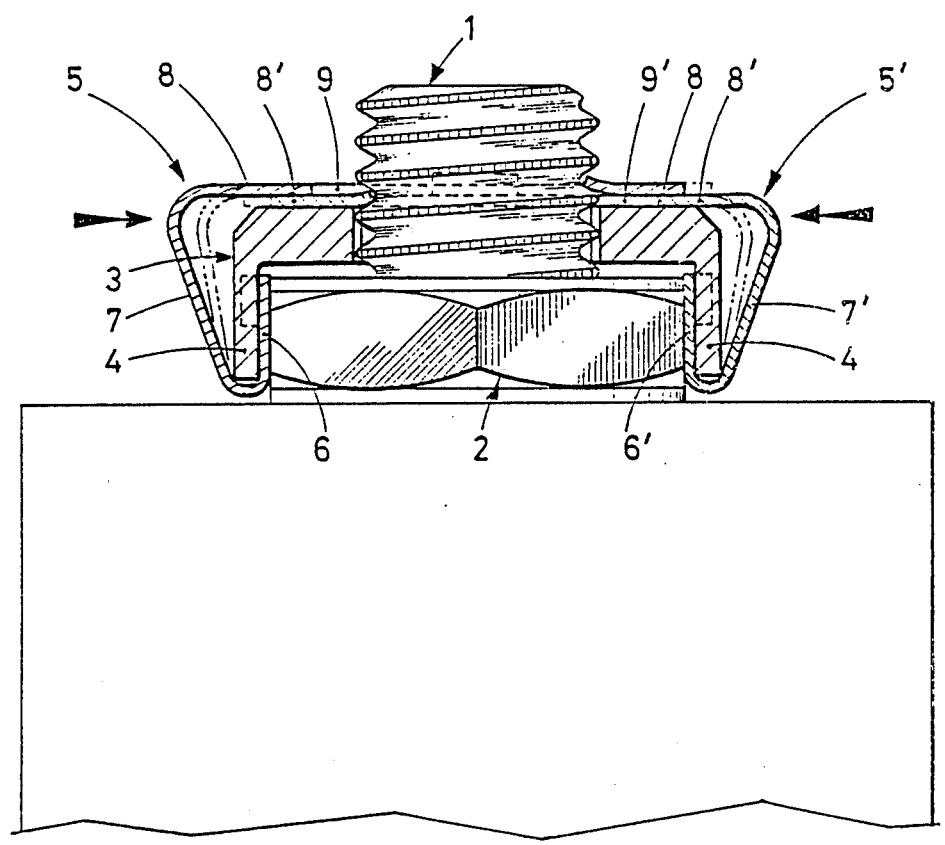
FIG. 1 is a view in elevation and partly in section of a nut screwed on a bolt and locked by an assembly according to the invention.

FIG. 1 represents a bolt 1 on which is screwed a nut 2 locked or braked by an assembly according to the invention.

In the known manner, the stem of the bolt has axial splines in the crests of its screw threads and a collar 3, defining an opening with corresponding splines and including two axially extending opposed lateral tabs 4, is mounted on the bolt 1 in such manner that the tabs 4 straddle the nut 2 and extend along two opposed flat sides of the latter and thus lock it against rotation.

According to the invention, the collar 3 is positively locked against any axial sliding along the splines of the bolt 1 by two elastically yieldable locking elements 5, 5' according to the represented embodiment.

Each element 5, 5' is formed by the punching and folding of a spring steel strip and comprises a first short branch 6, 6' connected by a bent portion to an oblique intermediate portion 7, 7' to which is connected a longer second branch 8, 8' by a second bent portion, these bent portions being such that the branches 6, 6' and 8, 8' make therebetween an angle slightly less then 90° in the unstressed state of the element 5, 5' (FIG. 2).

Each locking element 5, 5' defines an aperture 9, 9' of elongated shape (FIG. 4) having a rounded end 10, 10', its opposite end 11, 11' in the vicinity of the end of the branch 8, 8' being curved in the opposite direction with a radius substantially equal to the radius of the bolt 1, and the length of the aperture between the ends 10, 11 and 10', 11' and its width being distinctly greater than the diameter of the bolt 1.

Each element 5, 5' further comprises two lateral ears 12, 12' located at the end of the first branch 6, 6' and folded toward the intermediate portion 7, 7'.

In the illustrated embodiment, the assembly comprises two locking elements 5, 5' and, in this case, the second element 5' advantageously includes on its longer second branch 8' two other lateral ears 13 substantially in the middle of the length of the aperture 9' and bent in such manner as to extend toward the interior of the aperture and above the plane of the branch in the manner of a hook, for a purpose which will be specified hereinafter.

The positioning and the operation of the assembly according to the invention will now be described with reference to FIGS. 2 and 4.

The two locking elements 5, 5' are presented in opposite directions with the first branches 6, 6' parallel to the lateral tabs 4 of the collar 3 so as to engage the lateral tabs between the ears 12, 12' and consequently between the branches 6, 6' and the lateral portions 7, 7' respectively, the branches 8, 8' partly overlapping and the branch 8 of the first element 5 being introduced between the ears 13 of the element 5' by slightly elastically deforming the two elements. The dimensions of the branches and of the apertures are such that, in this position represented in FIG. 3, the edges 11, 11' of the corresponding ends of the apertures 9, 9' define therebetween a gap whose diameter is less than the diameter of the bolt 1.

It is then sufficient to exert a pressure on the intermediate portions 7, 7' of the two elements 5, 5' toward the bolt, as represented by the arrows in FIG. 1.

Owing to their elasticity, the two elements 5, 5' are deformed, the branches 8, 8' sliding on each other in opposite directions and spreading apart the edges 11, 11' of the apertures and thus increasing the size of the gap therebetween.

After a precise tightening of the nut 2 at the exact torque required by the assembly, it is then sufficient to mount the assembly represented in FIG. 3, partly in dot-dash lines, on the bolt 1 by making the splines of the bolt coincide with those of th collar 3.

The branches 6, 6' are then trapped between the tabs 4 of the collar (the spacing of which tabs takes, as manufactured, into account the thickness of these branches) and the corresponding flat side of the nut 2.

When the locking elements 5, 5' are released, they elastically resume their shape and the edges 11, 11' of the apertures come to be locked between the screw threads of the bolt and oppose, by bearing against the upper surface of the collar 3 and jamming, any displacement of the collar, even if large forces are applied. Note that a slight clearance between the collar 3 and the top of the nut 2 may result from a correct locking of the edges 11, 11' of the locking elements between the screw threads of the bolt, without altering the quality of the previously-defined retaining effect.

It will be observed that reversing the procedure enables the assembly to be easily removed, thereby permitting the untightening and removal of the nut.

As no component part has been permanently deformed, the assembly can be used again.

The ears 12 retain the locking elements on the collar and the ears 13 of the second element maintain the two elements 5, 5' against any risk of displacement.

What is claimed is:

1. A re-usable assembly for locking a nut on a bolt, said assembly comprising said nut which has flat sides, said bolt having a longitudinal axis and screw threads and axially extending splines on said screw threads, a collar having an opening defining inner splines complementary to said splines on said bolt and cooperative with said splines on said bolt, and two axially extending lateral tabs straddling the flat sides of the nut, at least one bent elastically yieldable locking element having a first branch bearing against one of said tabs of said collar and a second branch having a portion engaged between two of said screw threads of said bolt above said collar and in contact with said collar.

2. An assembly according to claim 1, wherein said first branch of said locking element includes means for retaining a tab of said collar associated therewith.

3. An assembly according to claim 1, comprising a locking element associated with each of said tabs of said collar.

4. An assembly according to claim 3, wherein each elastically yieldable locking element is made from a spring steel strip, said first branch thereof being parallel to said axis of said bolt and trapped between said tab of said collar and one of said flat sides of said nut, an intermediate portion of said locking element connecting said first branch to said second branch and ensuring the elasticity of said locking element.

5. An assembly according to claim 4, wherein, in an unstressed state of said locking element, said portion of said second branch engaged between said screw threads of said bolt extends partly across said opening of said collar.

6. An assembly according to claim 3, wherein said second branch of each locking element comprises an elongated aperture through which aperture said bolt extends in a direction substantially perpendicular thereto.

7. An assembly according to claim 6, wherein said aperture has a length which is a little greater than the diameter of said bolt.

8. An assembly according to claim 7, wherein said portion of said second branch engaged between said screw threads of said bolt defines a side of said aperture.

9. An assembly according to claim 6, wherein said second branch of one of said locking elements includes means for retaining said second branch of the other of said locking elements.

* * * * *